United States Patent [19]

Newhouse et al.

[11] Patent Number: 5,764,406

[45] Date of Patent: Jun. 9, 1998

[54] HYBRID OPTICAL AMPLIFIER HAVING IMPROVED DYNAMIC GAIN TILT

[75] Inventors: Mark Andrew Newhouse; Michael John Yadlowsky, both of Corning, N.Y.

[73] Assignee: Corning Incorporated, Corning, N.Y.

[21] Appl. No.: 877,098

[22] Filed: Jun. 17, 1997

Related U.S. Application Data

[60] Provisional application No. 60/027,335 Oct. 1, 1996.

[51] Int. Cl.$^6$ .................... H01S 3/30; G02B 6/28
[52] U.S. Cl. .................... 359/341; 359/161; 359/174; 359/337; 385/1
[58] Field of Search .................... 359/124, 161, 359/174, 337, 341; 385/1

[56] References Cited

U.S. PATENT DOCUMENTS

| | | | |
|---|---|---|---|
| 5,027,079 | 6/1991 | Desurvire et al. | 359/337 |
| 5,111,334 | 5/1992 | Heidemann | 359/341 |
| 5,185,826 | 2/1993 | Delavaux | 385/24 |
| 5,225,922 | 7/1993 | Chraplyvy et al. | 359/161 |
| 5,436,760 | 7/1995 | Nakabayashi | 359/341 |
| 5,530,583 | 6/1996 | Uno et al. | 359/341 |
| 5,664,131 | 9/1997 | Sugiya | 359/341 |

FOREIGN PATENT DOCUMENTS 7226558  8/1995  Japan.

OTHER PUBLICATIONS

M. Yamada et al., "Flattening The Gain Spectrum of an Erbium–doped Fibre Amplifier by Connecting an Er$^{3+}$–doped Multicomponent Fibre", Electronics Letters, vol. 1., No. 21, pp. 1762–1764, Oct. 13, 1994.

W.I. Way et al, "High Gain Limiting Erbium–Doped Fibre Amplifier with Over 30 dB Dynamic Range", Electronics Leters, vol. 27, No. 3, pp. 211–213, Jan. 31, 1991.

M. Shigematsu et al. 120 channel AM–VSB transmission by two wavelength multiplexed signals using gain flatted hybrid erbium–doped fibre amplifier, Electronics Letters, vol. 31, No. 13, pp. 1077–1079, Jun. 22, 1995.

E. Delevaque et al, Multichannel equalised and stabilised gain amplifier for WDM transmissions:, Electronics Letters, vol. 31, No. 25, pp. 2149–2150, Dec. 7, 1995.

"TUP—Gain Flattening for Fiber Amplifiers", OFC '95 Technical Digest, pp. 77–78 Kashiwapa et al.

M. Semenkoff et al. Improvement of gain flatness of optical fluoride fiber amplifiers for multiwavelength transmission:, Journal Of Non–Crystalline Solids 184, pp. 240–243, 1995.

*Primary Examiner*—Nelson Moskowitz
*Attorney, Agent, or Firm*—William J. Greener

[57] ABSTRACT

A hybrid, erbium doped fiber amplifier device has a dynamic gain tilt that is less than the gain tilt of any of the constituent fibers. The hybrid amplifying device has at most one less pumping source than the number of constituent waveguides of the device. The hybrid device automatically provides an effective change in the pump distribution among the constituent doped waveguide sections so as to achieve a readjustment of the relative gains of the constituent sections. As such, a change in the aggregate gain of the hybrid device will be as nearly spectrally uniform as possible over a range of gain values compared to the constituent doped waveguides. A method for constructing a hybrid optical amplifying device having improved dynamic gain tilt is also provided.

18 Claims, 2 Drawing Sheets

FIG. 1A
| Pin/ch (dBm) | G(1530nm) (dB) | G(1532.5) (dB) | G(1535) (dB) | variation in change: |
|---|---|---|---|---|
| -16.000 | 25.52 | 25.71 | 22.83 | |
| -12.000 | 20.70 | 21.02 | 18.97 | |
| change: | 4.82 | 4.69 | 3.85 | 0.97 dB |
FIG. 1B
| Pin/ch (dBm) | G(1530nm) (dB) | G(1532.5) (dB) | G(1535) (dB) | variation in change: |
|---|---|---|---|---|
| -16.000 | 21.35 | 23.91 | 26.03 | |
| -12.000 | 16.77 | 19.17 | 21.66 | |
| change: | 4.59 | 4.75 | 4.36 | 0.38 dB |
FIG. 3A
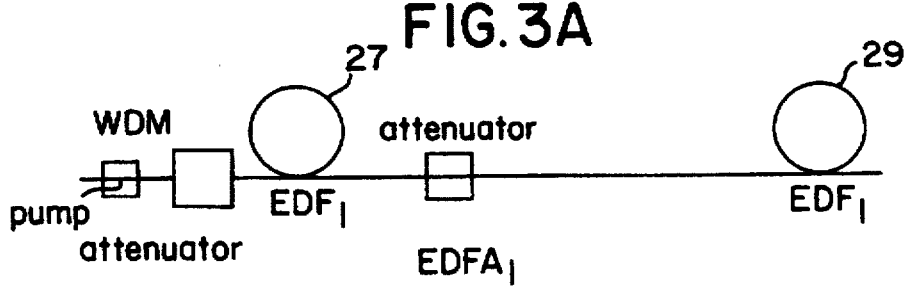
$EDFA_1$
FIG. 3B
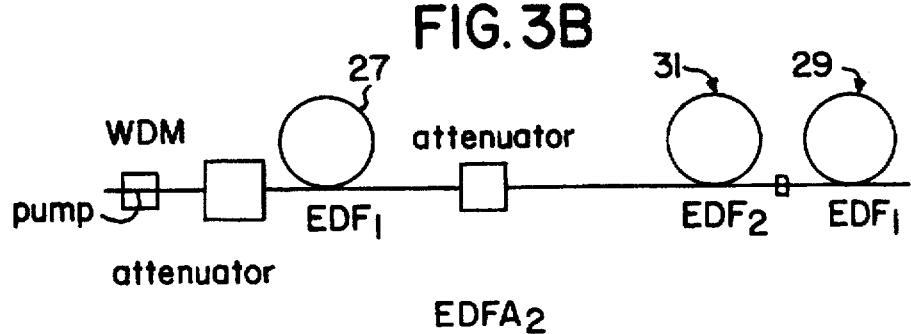
$EDFA_2$

HYBRID OPTICAL AMPLIFIER HAVING IMPROVED DYNAMIC GAIN TILT

This application claims Priority to Provisional application filed on Oct. 1, 1996 and given Ser. No. 60/027,335.

BACKGROUND OF THE INVENTION

1. Field of the Invention

This invention generally relates to optical signal amplification with improved dynamic gain tilt characteristics, and more particularly relates to a method for designing an hybrid optical signal amplifying apparatus or component thereof, and an hybrid optical signal amplifying apparatus or component thereof, having improved dynamic gain tilt characteristics.

2. Description of Related Art

All-optical amplifiers, and particularly, erbium doped fiber amplifiers, have experienced explosive deployment in fiber optic telecommunication systems because of the well recognized advantages that these types of devices have over repeater type amplification schemes. For example, the erbium doped fiber amplifier (EDFA) conveniently operates in the preferred 1550 nm third telecommunications spectral window, has high polarization—insensitive gain, low cross talk between signals at different wavelengths, good saturation output power, and a noise figure close to the fundamental quantum limit. The excellent noise characteristics potentially allow hundreds of amplifiers to be incorporated along the length of a fiber telecommunications link, which could then span thousands of kilometers. Optical amplifiers, and particularly EDFA's, in contrast to electronic repeaters, are also transparent to data rate, signal format, and wavelength over a limited range, making them especially useful for wavelength multiplexed communication systems that simultaneously transmit a large number of signals using different wavelength bands for each signal.

Despite their generally excellent characteristics, a disadvantage associated with EDFA's is their narrow spectral line width and uneven gain band. The useful telecommunications window of an EDFA is approximately 20–30 nm wide, while an ideal amplifier would have a flat spectral gain across the full spectrum which extends from approximately 1520 nm to 1570 nm. The peak wavelength of the erbium gain spectrum varies from about 1530 nm to 1535 nm depending upon the host glass material. As can be seen in FIG. 1, which shows the characteristic gain spectrum of a particular conventional EDFA, the gain as a function of wavelength varies; this variation will be referred to hereinafter as gain ripple. Numerous techniques have been published for widening and flattening the gain spectrum (i.e., reducing ripple) and include, for example, co-doping an erbium-doped silica glass fiber with $Al_2O_3$; changing the host glass material itself; using various forms of attenuating filters to reduce the gain at the emission peak; and constructing hybrid devices comprising two or more different types of serially connected erbium doped fiber and actively adjusting pump conditions independently in each fiber section to compensate for the different gain slopes of each type of fiber.

In addition to the frequently addressed concern about, and efforts to minimize, gain ripple, the significant problem dealt with by our invention is reducing or improving dynamic gain tilt. As used herein, dynamic gain tilt means the variation in gain at one wavelength as a result of changing the gain at any other wavelength via a change in input (i.e., pump and/or signal) power. Although the techniques described above for minimizing gain ripple can provide a relatively flat spectrum in a specified wavelength band for a specific set of input optical powers and wavelengths, the gain equalization performance degrades rapidly when the gain is changed (change in average population inversion levels) from the nominal conditions by changing the input power to the amplifier. One reported solution to this problem is allegedly achieved by a hybrid fiber device having cascaded amplifying stages with different gain spectra and an equal number of pump sources to allow the gain spectra of the individual stages to be effectively tuned independently so that when the total gain is changed, the relative contribution of each stage can be adjusted to arrive at the desired gain, with a resulting gain spectrum having a minimal amount of spectral distortion over the selected wavelength band. As an example, an erbium doped fiber having a positive gain slope may be combined with a different erbium doped fiber having a negative gain slope such that the hybrid device has a nearly flat gain at specific input power conditions. However, if the overall gain of the hybrid device must be changed, the gain slope of each of the constituent stages will generally change at different rates when the pump power input to one of the stages is changed. In order to achieve good compensation at the new operating point, the relative gain of each of the constituent gain stages must be readjusted to make the gain slopes again compensate each other. In implementing this type of amplifier, one skilled in the art would likely cascade two (or more) different erbium-doped fiber compositions and provide a separate pump source for each amplifying stage at an end of each stage so as to minimize the number of splices and make it as convenient as possible to independently control the pump power to each stage. However, this technique for reducing or improving dynamic gain tilt requires a complex control scheme during operation in which the total power of multiple pump sources must be carefully coordinated in order to realize gain slope compensation over a range of different gains (i.e., to change input power while maintaining a fixed target output power).

SUMMARY OF THE INVENTION

It is an object of the invention to describe a method for designing a hybrid optical signal amplifying device or component thereof, preferably an EDFA, including constituent erbium-doped fibers (EDF's) of different co-dopant compositions, that provides an effective automatic change in the pump distribution or partitioning among the constituent EDF sections so as to achieve a readjustment of the relative gains of the constituent EDF sections. Accordingly, a change in the aggregate gain of the hybrid device will be as nearly spectrally uniform as possible over a range of gain values (i.e. dynamic gain tilt optimization) compared to the constituent doped fibers.

It is another object of the invention to provide a hybrid optical signal amplifying device or component thereof, and to describe a method which provides essentially automatic or passive equalization of the gain at different wavelengths over a selected wavelength band in response to a change in the gain brought about by variations in input signal and/or pump powers.

It is a further object of the invention to provide a hybrid optical amplifying device, and to describe a method for making such a device, for adjusting the shape of the gain spectrum (gain ripple control) at a given set of operating conditions while simultaneously reducing, or improving, the dynamic gain tilt associated with use of the device.

These and other objects and advantages are realized in a hybrid optical waveguide amplifying device embodiment that includes a number (n) of constituent doped waveguides (n≥2) where at least a portion of each of the constituent doped waveguides are serially interconnected and where each constituent waveguide has a unique composition and a measurable dynamic gain tilt parameter $\gamma_{(i)}(\lambda)_{(i=1 \text{ to } n)}=[g_{(i)}^*(\lambda)+\alpha_{(i)}(\lambda)]$, where $g_{(i)}^*(\lambda)$ is the gain coefficient of the $i^{th}$ section of doped waveguide in the limit of unlimited pump power such that substantially all of the dopant ions are in an excited state, and $\alpha_{(i)}(\lambda)$ is the absorption coefficient of the $i^{th}$ section of doped waveguide in the limit of no pump power as measured by a weak probe signal such that substantially all of the dopant ions are in a ground state; and at most, (n−1) pumping radiation sources for populating an upper amplification level of the hybrid device; wherein the hybrid waveguide device has a measurable dynamic gain tilt $\Gamma(\lambda)=[\Delta G(\lambda)/\Delta G(\lambda_{Ref})]$ where $\Delta G$ is the change in the optical gain brought about by a change in input (signal or pump) power (amplifier doped fiber length fixed) that is less than any constituent $\gamma_i(\lambda)/\gamma_i(\lambda_{Ref})$ value.

In an aspect of this embodiment, the light amplifying dopants are one or more of the rare earth elements, for example, erbium.

In an aspect of the invention, a hybrid device as described above will constitute a planar device including planar constituent waveguides. In another embodiment of the invention, the constituent doped waveguides are optical fibers. In an aspect of this embodiment, the fibers are erbium-doped aluminosilicate and erbium-doped germanosilicate compositions. In alternative embodiments, one or more of the constituent waveguides could be Z-BLAN or oxyhalide, including fluoride based glass compositions.

Although the simplest hybrid device contemplated by an embodiment of the invention contains two different, serially connected erbium doped fibers, and a single pump source coupled to an end region of one of the constituent fibers, a person skilled in the art will appreciate that because the cross sectionally averaged inversion in an erbium doped fiber of a single composition changes by different amounts at different points along the length of the erbium doped fiber in response to a change in input power, there may be multiple combinations of constituent fiber lengths and ordering of at least portions of each of the fiber lengths that will achieve the objects of the invention. For many amplifier designs, particularly those employing forward pumping due to the advantages in noise performance in such a design, the highest degree of automatic effective pump compensation will not be realized by a hybrid EDF with only one composition fiber serially connected to another, different composition fiber. Therefore, contrary to current hybrid amplifier design practice, it may be beneficial to imbed a section of one constituent erbium doped fiber composition between two sections of a different constituent erbium doped fiber composition. However, in the case of a hybrid including more than two constituent erbium doped fiber compositions, a specific ordering of each composition may be preferred over a hybrid having repeating sections of a same composition of erbium doped fiber. Thus when a section of $EDF_1$ is positioned intermediate two sections of $EDF_2$, for example, the amount or length of $EDF_1$ needed to achieve optimum automatic gain change compensation will depend on how the total length of $EDF_2$ is allocated between its two constituent portions. Such selective ordering promotes the simultaneous adjustment of gain shape at a given operating condition (gain ripple) and dynamic gain tilt adjustment.

The invention also describes a method of constructing a hybrid optical waveguide amplifying device or component thereof which involves selecting the different constituent doped waveguides (denoted by subscript "n"); serially interconnecting at least a portion (denoted by subscript "m") of each of the constituent waveguides to at least a portion of the other constituent waveguides; pumping the hybrid device with at most, one less pumping source than the number of constituent waveguides used; determining the performance of the best linear combination of the constituent waveguides and choosing constituent waveguide lengths and ordering such that the dynamic gain tilt of the hybrid device has as small an absolute deviation as desirable over the selected wavelength band. This method involves the steps of determining a target dynamic gain tilt $\Gamma(\lambda)_{Target}=\Sigma_{(over\ i,\ i=1\ to\ m)}w_{(i)}^{TARGET}\gamma_{(i)}^{NORM}$; determining a gain value $G(\lambda)=\Sigma_{(over\ i)}\{n_2^i[g_{(i)}^*(\lambda)+\alpha_{(i)}(\lambda)]-\alpha_{(i)}(\lambda)\}L_i$ at a selected pump and/or input signal power level; changing the value of the pump and/or input signal power level to produce a gain change, $\Delta G$, and calculating a value of the change in the average dopant ion population inversion, $\Delta n_2^{(i)AVG}$; and iteratively determining a value of an actual weighting function $w_{(i)}^{ACTUAL}=[\Delta n_2^{(i)} L_i \gamma^{max}_{(i)}/\Sigma_{j,\ j=1\ to\ m}(\Delta n_2^{(i)} L_j \gamma^{max}_{(i)})]$, until a satisfactory convergence between the target dynamic gain tilt, $\Gamma(\lambda)_{Target}$, and the actual dynamic gain tilt, $\Gamma(\lambda)$, is achieved.

The method of the invention further comprises tailoring the gain spectrum as described above such that it matches the filtering response of conventionally available filters.

A preferred embodiment of the invention will now be described in detail with reference to the drawings.

BRIEF DESCRIPTION OF THE DRAWINGS

FIG. 3A illustrates schematically an implementation of a forward pumped, two-segment single composition aluminosilicate erbium doped fiber amplifying device; and FIG. 3B illustrates a hybrid device comprising a constituent germanosilicate doped fiber located intermediate two sections of a constituent aluminosilicate fiber;

Figure 1:
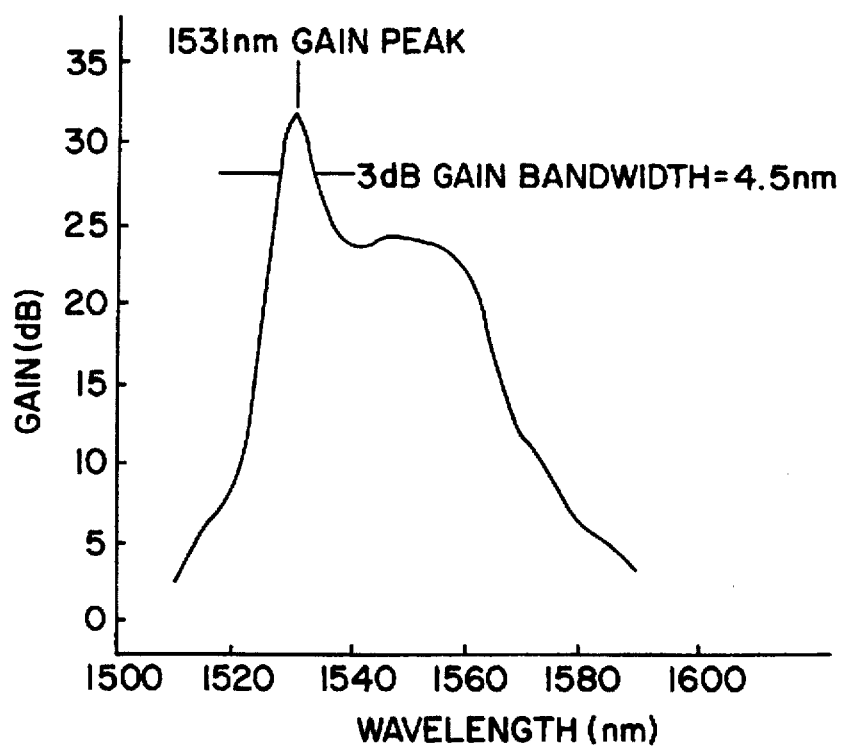
FIG. 1 shows a typical gain spectrum of a conventional EDFA.

Tables 1A and 1B list the changes in gain in two signal channels and in a probe channel as a result of a 4 dB increase in the signal power per channel of the two EDFAs of FIGS. 3A and 3B, respectively.

DETAILED DESCRIPTION OF A PREFERRED EMBODIMENT OF THE INVENTION

For a wide variety of glass hosts, rare earth doped optical amplifiers and, particularly, EDFA's are effectively homogeneously broadened, and the overlap of dopant ions with the signal modes is nearly wavelength independent. As such, the gain spectrum, here being the small signal gain that would be measured by a weak probe signal while the operating point of the amplifier is fixed, is constrained to a single parameter family of wavelength dependencies. Therefore, if the gain of the amplifier at some reference wavelength is changed due to a change in input (i.e., pump and/or signal power), the amplifier gain at other wavelengths will change by well defined amounts that likely are different from the amount of gain change at the reference wavelength. The wavelength dependence of the amplifier gain change as a result of an input change is referred to herein as dynamic gain tilt, $\Gamma$. Thus dynamic gain tilt is a distortion of the amplifier gain spectrum for operating conditions that differ from the operating point for which the amplifier was designed.

The dynamic gain tilt of an EDFA can be quantified by a wavelength dependent function equal to the change in gain (in dB) as a function of wavelength, between two operating points, A and B, in response to a change in input power(s) divided by the change in gain of the amplifier at a reference wavelength in response to the same change in optical input. In other words, $$\Gamma(\lambda) = [G(\lambda)_B - G(\lambda)_A]/[G(\lambda_{ref})_B - G(\lambda_{ref})_A],$$

where $G(\lambda)$ is the measurable gain and $\lambda_{ref}$ is the wavelength for which $\Delta G(\lambda)$ is a minimum value.

It will be appreciated by those skilled in the art that the complicated dynamics of dynamic gain tilt are simplified under the assumption that essentially all of the amplifying dopant ions are sufficiently radially confined such that the mode fields of the optical inputs are substantially unchanged over the doped cross section of the waveguide. More generally, the overlap of the signal mode fields with the radial distribution of the fractional population of the upper amplifier level is independent of signal wavelength. This simplification makes it possible to express the gain, $G(\lambda)$, (in dB), of a single erbium doped fiber (EDF), as $$G(\lambda) = [n_2^{AVG}(g^* + \alpha) - \alpha]L,$$

where L is the length of the EDF, $g^*$ is the gain per unit length (dB/length) of the EDF in the limit of strong pumping such that substantially all of the erbium ions are in the upper or excited amplification state, $\alpha$ is the absorption coefficient measured in the limit of a weak probe signal which leaves nearly all dopant ions in their ground state, and $n_2^{AVG}$ is the normalized average inversion of the EDF where $n_2^{AVG} = (Lp)^{-1} \int_{0-L} N_2(z)dz$, where $N_2(z)$ is the local density of dopant ions in their upper state and p is the overall density of active dopant ions. In this approximation, $\Gamma(\lambda) = \gamma(\lambda)/\gamma(\lambda_0)$, where the dynamic gain tilt parameter $\gamma(\lambda) = g^*(\lambda) + \alpha(\lambda)$. For virtually all commercially available EDF's, $\Gamma(\lambda)$ depends only weakly, at most, on the operating point (i.e., pumping scheme) and $\Delta G$ (i.e., points A and B), and is practically determined by the optical properties of the EDF itself.

It is known that the quantities $g^*$ and $\alpha$ are proportional to the emission and absorption cross sections of the fiber, $\sigma_E$ and $\sigma_A$, respectively, but are more easily measurable quantities than the cross sections themselves. The change in the logarithm of the EDFA gain as the average inversion of the amplifier is changed is proportional to the sum of the absorption and emission cross sections, $(\sigma_E + \sigma_A)$, of the erbium doped fiber, while the magnitude of the change is related to the amount by which the average inversion in the device has changed. The sum of the cross sections can exhibit a very peaked nature, particularly in a wavelength band near the erbium peak at approximately 1532 nm. As a result of dynamic gain tilt, the gain spectrum will exhibit a relative change that has the same sharp spectral features as the cross section sum. By producing an EDFA out of different constituent erbium doped fiber compositions and, therefore, different cross section spectra, we believe that it is possible to automatically, effectively broaden the peak of the cross section sum. If the effective sum of the cross sections of the hybrid fiber amplifier is relatively constant over some wavelength band, then the gain spectrum of the amplifier will change in a spectrally uniform manner, minimizing the amount of dynamic gain tilt introduced by gain variations. The invention is particularly effective for the band of wavelengths that exist between the erbium gain peaks of a pair of doped fibers of different compositions.

Although the dynamic gain tilt parameter, $\gamma(\lambda)$, for an EDFA of a single composition is represented by the sum $(g^* + \alpha)$, a hybrid fiber amplifier device defies such simple characterization because it does not have a unique average inversion, but rather an average inversion for each EDF type. Therefore the hybrid tilt parameter can be written as a weighted sum of $(g^* + \alpha)$ for the constituent fibers. Thus when the weighted sum of the hybrid device is as flat as possible over the wavelength band of interest, a dynamic gain tilt improvement can be realized.

In accordance with the foregoing discussion, an embodiment of the invention provides a hybrid amplifying optical waveguide having improved dynamic gain tilt characteristics over a selected wavelength range, $\Delta\lambda$, and comprises (n) constituent doped waveguides ($n \geq 2$), at least portions of each being serially interconnected, wherein each constituent waveguide has a unique composition and a unique dynamic gain tilt parameter $\gamma_{(i)}(\lambda)_{(i=1 \text{ to } n)}$, where $$\gamma_{(i)}(\lambda)_{(i=1 \text{ to } n)} = [g_{(i)}^*(\lambda) + \alpha_{(i)}(\lambda)];$$

and, at most, $(n-1)$ pumping radiation sources for populating an upper amplification level of the device. The hybrid waveguide has a measurable effective dynamic gain tilt $\Gamma(\lambda)$ defined as $$\Gamma(\lambda) = \Sigma_{(over\ i)} w_{(i)}^{ACTUAL} \gamma_{(i)}^{NORM}$$

that is less than any $\gamma_i(\lambda)$, where $w_{(i)}^{ACTUAL}$ is a normalized weighting function defined as $$w_{(i)}^{ACTUAL} = [\Delta n_2^{(i)} L_i \gamma^{max}_{(i)} / \Sigma_j (\Delta n_2^{(j)} L_j \gamma^{max}_{(j)})],$$

where $\Delta n_2^{(i),AVG}$ is the change in the average dopant ion population inversion of the $i^{th}$ section of the hybrid waveguide in response to a change in pump power, $L_{(i)}$ is the length of the $i^{th}$ section of waveguide, and $\gamma_{(i)}^{NORM} = \gamma_i(\lambda)/\gamma^{max}_{(i)}$, where $\gamma^{max}_{(i)}$ is the maximum value of $\gamma_i(\lambda)$ over $\Delta\lambda$. The doped waveguides are preferably doped with erbium, and are preferably fiber waveguides as opposed to planar waveguides. The wavelength band, $\Delta\lambda$, preferably extends between a few nm to about 100 nm, and for the erbium doped embodiment preferably is in the range of 1520 nm to 1570 nm, and more preferably is in the ranges from 1530 nm to 1540 nm and 1540 nm to 1560 nm.

Figure 2:
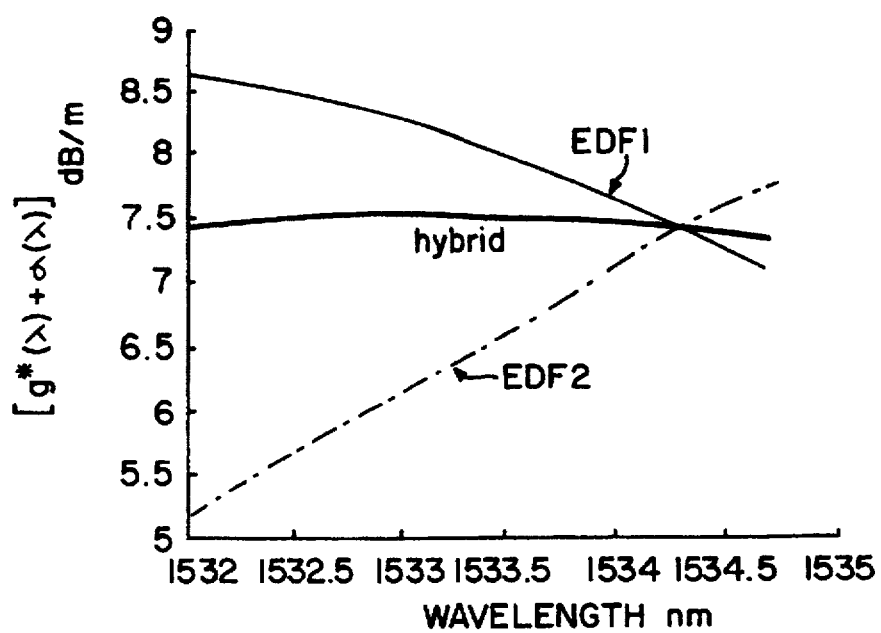
FIG. 2 is a graph of the dynamic gain tilt parameter for two constituent erbium doped fibers and a hybrid fiber made from the constituents plotted against wavelength, showing the improvement in the variation of the dynamic gain tilt of the hybrid over any of the constituents over a selected wavelength band.

In an exemplary embodiment of the invention, with reference to FIG. 2, a hybrid amplifying fiber has an effective dynamic gain tilt that is at least 30% less than that of any constituent fiber. The vertical axis in FIG. 2 represents the dynamic gain tilt parameter $(g^* + \alpha)$ over a wavelength band, $\Delta\lambda$, which is represented along the horizontal axis (here near 1532 nm). The curve represented as EDF1 shows the essentially linearly decreasing gain tilt coefficient for a constituent aluminosilicate erbium-doped fiber, and the curve labeled EDF2 shows a linearly increasing gain tilt coefficient for a germanosilicate erbium-doped fiber. The solid line labelled HYBRID shows the improvement in the deviation of the gain tilt parameter of the hybrid optical fiber consisting of 65% weighting of EDF1 and 35% weighting of EDF2 (where the term "weighting" refers to $w_i$ defined above). To reiterate, the improvement in the effective cross section sum of the hybrid means that as the gain of the amplifier is changed by changing the input signal and/or pump power, the relative gain contribution from the two types of constituent EDF's will automatically change so as to nearly equalize the spectral dependence of the gain change. FIG. 3A shows an exemplary hybrid erbium doped amplifying fiber comprising a split length (27, 29) of a single composition aluminosilicate EDF having an $\alpha_{peak}L$ value of 79.4 dB. Table 1A lists the changes in the gain at two signal wavelengths, 1530 nm and 1535 nm, and at a weak probe signal wavelength of 1532.5 nm for a 4 dB change (−16 dbm to −12 dbm) in input power. For the single composition fiber there is nearly a 1.0 dB gain variation (dynamic gain tilt) between the two signal wavelengths. FIG. 3B schematically shows a forward pumped hybrid erbium doped amplifying fiber according to the invention including a hybrid EDF having the same total $\alpha_{peak}L$ value as the EDF in FIG. 3A, comprising a section (31) of germanosilicate EDF (EDF$_2$) with $(\alpha_{peak}L)_2$=15.3 dB, interconnected to two sections (27, 29) of aluminosilicate EDF (EDF$_1$ and EDF$_3$), with $(\alpha_{peak}L)_1$=25.43 dB and $(\alpha_{peak}L)_3$=36.68 dB. The improvement in dynamic gain tilt of the hybrid device can be seen in Table 1B which shows only a 0.38 dB gain variation between the two single channels. The gain slope and dynamic gain tilt characteristics of the constituents and hybrid EDF are shown in FIG. 2.

Another embodiment of the invention describes a method for constructing a hybrid optical waveguide amplifying device having improved dynamic gain tilt characteristics over a selected wavelength band, $\Delta\lambda$, which involves an iterative calculation that requires selecting (n) different constituent doped optical fibers and determining a dynamic gain tilt parameter $\gamma_{(i)(\lambda)(i=1 \ to \ n)}=[g_{(i)}^*(\lambda)+\alpha_{(i)}(\lambda)]$ for each constituent fiber over a wavelength band, $\Delta\lambda$, of interest; interconnecting at least a portion, $L_i$, of each of the constituent waveguides such that at least a portion of all of the different constituent waveguides are serially interconnected; providing, at most, (n−1) sources of pumping power for populating an upper amplification level of the hybrid device; and selecting an optimum effective sum of cross sections by calculating the linear combination of the constituent gain tilt parameters that is flattest over the selected wavelength band. The optimum target dynamic gain tilt $\Gamma(\lambda)_{Target}=\Sigma_{(over \ i)}w_{(i)}^{TARGET}\gamma_{(i)}^{NORM}$, where the $w_{(i)}$ are subject to the condition that $\Sigma_{(over \ i)}w_{(i)}^{TARGET}$=1, and $\Gamma(\lambda)_{Target}$ has a decreased, and preferably a minimum, absolute deviation over $\Delta\lambda$, where $w_{(i)}^{TARGET}$ is chosen mathematically by proper choice of the $w_{(i)}^{TARGET}$ subject to the above constraints.

For a selected pump and/or signal input power, one can calculate a gain value for the hybrid, $G(\lambda)=\Sigma_{(over \ i)}\{n_2^i[g_{(i)}^*(\lambda)+\alpha_{(i)}(\lambda)]-\alpha_{(i)}(\lambda)\} L_i$. A finite gain change $\Delta G$ can now be chosen, where $\Delta G$ is representative of the change in gain over which the amplifier spectrum is intended to remain flat. From the perspective of dynamic gain tilt, the hybrid amplifier thus behaves as though it has an effective dynamic gain tilt, $\Gamma_{Target}$ as described above. If a set of target weighting functions is found such that the relative variation of $\Gamma_{Target}$ over the wavelength band $\Delta\lambda$ is significantly smaller than that of any constituent $\gamma_{(i)}$, then it will be beneficial to determine the construction of a hybrid amplifying device according to the method of the invention. This is accomplished by implementing the desired gain change $\Delta G$, and calculating the value of $\Delta n_2^{(i)AVG}$ which represents the change in the average dopant ion population inversion of each constituent EDF. However, in order to know the value of $\Delta n_2^{(i)AVG}$ exactly, the actual constituent fiber lengths, $L_i$, and the arrangement or ordering of the EDF constituents, must be known. This type of situation is the source of the iterative nature of the inventive method described herein. Preferably, the constituent waveguide compositions will be selected and selected lengths of each of the constituent waveguides will be serially interconnected as described above. An initial guess as to length and ordering must be made. Once the value of $\Delta n_2^{(i)AVG}$ is calculated, one skilled in the art can use this information to update the initial length values, $L_i$, to determine a value $w_{(i)}^{ACTUAL}=[\Delta n_2^{(i)} L_i \gamma^{max}_{(i)}/\Sigma_j (\Delta n_2^{(i)} L_j \gamma^{max}_{(i)})]$ on an iterative basis until there is satisfactory convergence between $\Gamma(\lambda)$ and $\Gamma(\lambda)_{Target}$, where $\Gamma(\lambda)=\Sigma_{(over \ i)}w_{(i)}^{ACTUAL}\gamma_{(i)}^{NORM}$. This process is likely to insure that the relative change in $\Gamma(\lambda)$ is significantly closer to the value of $\Gamma(\lambda)_{Target}$ than any of the constituent dynamic gain parameter values, $\gamma_{(i)}$.

Alternatively, one skilled in the art can perform a brute force numerical search to find the lengths and ordering of the constituents necessary to match $w_{(i)}^{ACTUAL}$ to $w_{(i)}^{TARGET}$ (for all i). It will be appreciated however that there will likely be more than one, and possibly many physical realizations of EDF lengths and distributions that match $\Gamma(\lambda)$ to $\Gamma(\lambda)_{Target}$; therefore, there will be some flexibility to choose among the various designs for one that also produces an improved or minimum gain ripple. While it may not be possible to actually flatten the gain spectrum with this technique, it is possible to make the resultant gain ripple easier to flatten since the gain spectrum can be shaped to match a filter response provided by available filter technology. It will be appreciated that since the change in the sum of the cross sections has been controlled, once the gain spectrum is flattened by other means it will tend to remain flatter as the EDFA inversion changes in response to changes in the input power to the device.

What is claimed:

1. A hybrid optical waveguide component for an optical amplifying device having improved dynamic gain tilt characteristics over a selected wavelength range, $\Delta\lambda$, comprising:

(n) constituent doped waveguides with n≥2, at least portions of each of the waveguides being serially interconnected, wherein each constituent waveguide has a unique composition and a unique dynamic gain tilt characteristic defined as $\gamma_{(i)}(\lambda)_{i=1 \ to \ n}$, where $\gamma_{(i)}(\lambda)_{i=1 \ to \ n}=[g_{(i)}^*(\lambda)+\alpha_{(i)}(\lambda)],$ where $g_{(i)}^*(\lambda)$ is the gain coefficient of the i$^{th}$ section of doped waveguide in the limit of unlimited pump power such that substantially all of the dopant ions are in an excited state and $\alpha_{(i)}(\lambda)$ is the absorption coefficient of the i$^{th}$ section of doped waveguide in the limit of no pump power and a weak probe signal such that substantially all of the dopant ions are in a ground state; and at most, (n−1) pumping radiation sources for populating an upper amplification level of the device;

wherein the hybrid waveguide has an effective dynamic gain tilt defined as $\Gamma(\lambda)=\Sigma_{(over \ i)}w_{(i)}^{ACTUAL}\gamma_{(i)}^{NORM}$ that has a value that is always less than any $\gamma_i(\lambda)$, where $w_{(i)}^{ACTUAL}$ is a normalized weighting function defined as $w_{(i)}^{ACTUAL}=[\Delta n_2^{(i)} L_i \gamma^{max}_{(i)}/\Sigma_j (\Delta n_2^{(i)} L_j \gamma^{max}_{(i)})],$ where $\Delta n_2^{(i)AVG}$ is the change in the average dopant ion population inversion of the i$^{th}$ section of the hybrid waveguide in response to a change in pump power, $L_{(i)}$ is the length of the i$^{th}$ section of waveguide, and $\gamma_{(i)}^{NORM}=\gamma_i(\lambda)/\gamma^{max}_{(i)}$, where $\gamma^{max}_{(i)}$ is the maximum value of $\gamma_i(\lambda)$ over $\Delta\lambda$.

2. The device of claim 1 wherein the constituent waveguides are doped with a rare earth element.

3. The device of claim 1 wherein the constituent waveguides are doped with erbium.

4. The device of claim 1 wherein the constituent waveguides are optical fiber waveguides.

5. The device of claim 1 wherein the defined wavelength band $\Delta\lambda$ has a value of between about a few nm to 100 nm.

6. The device of claim 1 wherein the defined wavelength band $\Delta\lambda$ is in a range from about 1520 nm to 1570.

7. The device of claim 1 wherein the defined wavelength band $\Delta\lambda$ is in a range from about 1530 nm to 1540 nm.

8. The device of claim 1 wherein the defined wavelength band $\Delta\lambda$ is in a range from about 1540 nm to 1560 nm.

9. The device of claim 4 wherein n=2, and the first constituent fiber has an erbium-doped germanosilicate composition, and the second constituent fiber has an erbium-doped aluminosilicate composition, wherein $\Gamma(\lambda) \leq 30\%$ of either $\gamma_1(\lambda)$ or $\gamma_2(\lambda)$.

10. The device of claim 1 wherein $\Gamma(\lambda) \leq 30\%$ of any $\gamma_i(\lambda)$.

11. The device of claim 4 wherein at least one section of one constituent fiber is located intermediate two sections of one other constituent fiber.

12. A method for constructing a hybrid optical waveguide amplifying device having improved dynamic gain tilt characteristics over a selected wavelength band, $\Delta\lambda$, comprising the steps of:

a) selecting (n) different constituent doped optical waveguides and determining a dynamic gain tilt value $\gamma_i(\lambda)$(i=1 to n) for each over $\Delta\lambda$;

b) interconnecting at least a portion, $L_i$, of one of the constituent waveguides with at least a portion, $L_j$, of a different constituent waveguide such that at least a portion of each of the (n) waveguides are interconnected;

c) providing, at most, (n−1) sources of pumping power for populating an upper amplification level of the hybrid device;

d) determining a target dynamic gain tilt, $\Gamma(\lambda)_{Target} = \Sigma_{(over\ i)} w_{(i)}^{TARGET} \gamma_{(i)}^{NORM}$, such that $\Sigma_{(over\ i)} w_{(i)}^{TARGET} = 1$ and $\Gamma(\lambda)_{Target}$ has a minimum absolute deviation over $\Delta\lambda$.

13. The method of claim 12 further comprising the steps of f) determining a gain value, $G(\lambda)$, at at least one of a selected pump power and input signal power level, where $G(\lambda) = \Sigma_{(over\ i)} \{n_2^i[g_{(i)}^*(\lambda) + \alpha_{(i)}(\lambda)] - \alpha_{(i)}(\lambda)\} L_i$;

g) changing the at least one of a selected pump power and input signal power level to implement a desired gain change, $\Delta G$, and calculating a value $\Delta n_2^{(i)AVG}$ representing the change in the average dopant ion population inversion;

h) iteratively determining a value $w_{(i)}^{ACTUAL} = [\Delta n_2^{(i)} L_i \gamma_{(i)}^{max}/\Sigma_j (\Delta n_2^{(i)} L_j \gamma_{(j)}^{max})]$ such that there is a satisfactory convergence between $\Gamma(\lambda)$ and $\Gamma(\lambda)_{Target}$ where $$\Gamma(\lambda) = \Sigma_{(over\ i)} w_{(i)}^{ACTUAL} \gamma_{(i)}^{NORM}.$$

14. The method of claim 13 wherein the step (h) further comprises updating at least one of the $L_{(i)}$'s and a positional ordering of the $L_{(i)}$'s.

15. The method of claim 12 comprising minimizing the deviation of the gain (gain ripple) over the selected wavelength band.

16. The method of claim 12 comprising tailoring the gain to match a selected filter response.

17. The device of claim 1 wherein at least one of the constituent doped waveguides comprises one of a ZBLAN and an oxy-halide based glass composition.

18. The device of claim 17 comprising a fluoride based glass composition.

* * * * *